Figure 1:
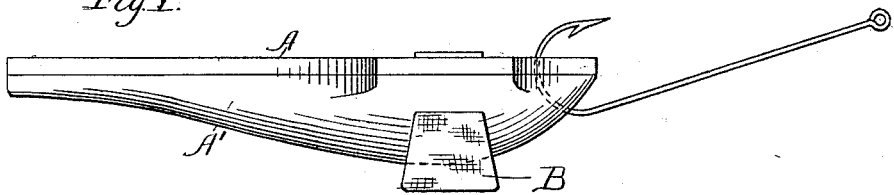

No. 713,907. Patented Nov. 18, 1902.
B. F. McCURDY.
FISH BAIT.
(Application filed Mar. 24, 1902.)

(No Model.)

Witnesses:
Wm. Geiger
A. M. Munday

Inventor:
Benjamin F. McCurdy
By Munday, Evarts & Adcock
Attorneys.

THE NORRIS PETERS CO., PHOTO-LITHO., WASHINGTON, D. C.

UNITED STATES PATENT OFFICE.

BENJAMIN F. McCURDY, OF CHICAGO, ILLINOIS, ASSIGNOR TO EDWINA M. McCURDY, OF CHICAGO, ILLINOIS.

FISH-BAIT.

SPECIFICATION forming part of Letters Patent No. 713,907, dated November 18, 1902.

Application filed March 24, 1902. Serial No. 99,761. (No model.)

*To all whom it may concern:*

Be it known that I, BENJAMIN F. MCCURDY, a citizen of the United States, residing in Chicago, in the county of Cook and State of Illinois, have invented a new and useful Improvement in Fish-Bait, of which the following is a specification.

This invention relates to an improved fish-bait; and it consists in the structure or article shown in the drawings and set forth in the following description.

Figure 2:
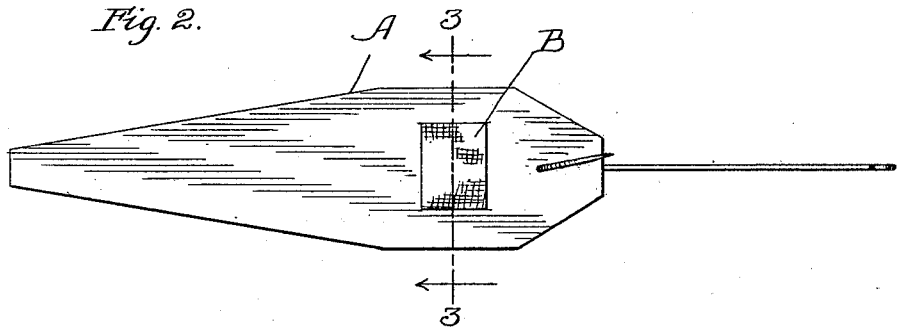
Figure 3:
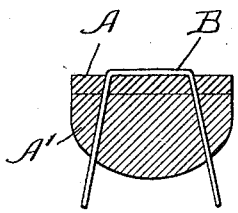

In the drawings which form a part of this specification, Figure 1 is a side view of my improved bait. Fig. 2 is a top or plan view thereof, and Fig. 3 is a cross-section on line 3 3 of Fig. 2.

It has been found by experience that an attractive casting-bait for fish, and especially for pickerel or bass, is or may be made of a strip of raw pork, preferably salt pork, whether because of its softness, flexibility, and color I cannot pretend to say; but the fact remains and is known to fishermen that this bait is a successful one for catching fish. Sometimes fishermen have used such a bait with a hook which is provided with red feathers or other red material secured to the hook, and this has been found to improve the catching qualities of the bait.

I have discovered that the bait is rendered still more effective if the red material—such as red flannel, for example—is attached immediately to the bait itself instead of to the hook, as this gives a more life-like appearance.

To make my improved bait, I take a piece of pork-rind with a portion of pork adhering thereto and shape the same roughly in the form of a minnow, the rind preferably forming the back of the minnow. I pierce this piece of pork-rind and attach near the head of the fish-form and about where the red gills of the fish would be in nature a piece of red flannel. This bait may be affixed to the hook-point, as an ordinary minnow is fastened, in any position; but I prefer to hook it through the front part of the head, as indicated in the drawings.

In said drawings, A represents a strip of pork-rind with a portion of the fat pork A' adherent thereto, the whole piece being shaped roughly in the form of a minnow, as indicated in the drawings. B is a strip of red flannel or like material passed through two holes in the fish-body and the ends depending at each side in sight. A portion of this red flannel can be seen from whatever point the fish is viewed. This fish-form of salt-pork rind and pork may be easily manufactured, being cut out with a die and the strips of flannel thereafter threaded through the same, and the completed article will keep for a long time if a number of them are done up in a suitable box or package. If the pork is not sufficiently salt to keep well, a portion of salt may be put in the box or package with the bait. By treating the bait in this way—that is to say, packing a number of the baits in a box as an article of manufacture—it may be readily put upon the trade, and thus handled as an article of trade and will prove to be much superior as a bait to the ordinary artificial baits made out of metal or even to those made out of inodorous tasteless soft material—as, for example, rubber.

I claim—

1. As an article of manufacture, the artificial bait made of a piece of pork-rind with a portion of the pork adhering thereto, cut in the form of a minnow and having a piece of fabric attached directly thereto, substantially as specified.

2. As an article of manufacture, the artificial bait consisting of a piece of pork-rind cut in the form of a minnow and having a piece of fabric attached thereto by being passed through two holes in the minnow, substantially as specified.

3. As an article of manufacture, a box or package of artificial minnows made of salt-pork rind, each having a piece of fabric attached thereto, and containing an antiseptic preservative, substantially as specified.

BENJAMIN F. McCURDY.

Witnesses:
H. M. MUNDAY,
EDW. S. EVARTS.